(12) United States Patent
Sheikh et al.

(10) Patent No.: US 9,852,540 B2
(45) Date of Patent: Dec. 26, 2017

(54) GRAPHICS LIGHTING ENGINE INCLUDING LOG AND ANTI-LOG UNITS

(75) Inventors: Farhana Sheikh, Hillsboro, OR (US); Sanu Mathew, Hillsboro, OR (US); Ram Krishnamurthy, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 103 days.

(21) Appl. No.: 13/976,920

(22) PCT Filed: Dec. 31, 2011

(86) PCT No.: PCT/US2011/068265
§ 371 (c)(1),
(2), (4) Date: Jun. 27, 2013

(87) PCT Pub. No.: WO2013/101235
PCT Pub. Date: Jul. 4, 2013

(65) Prior Publication Data
US 2014/0028677 A1    Jan. 30, 2014

(51) Int. Cl.
*G06T 15/50* (2011.01)

(52) U.S. Cl.
CPC ............ *G06T 15/50* (2013.01); *G06T 15/506* (2013.01)

(58) Field of Classification Search
CPC .............................. G06T 15/50; G06T 15/506
USPC ....................................................... 345/426
See application file for complete search history.

(56) References Cited

U.S. PATENT DOCUMENTS

| | | | | |
|---|---|---|---|---|
| 5,257,355 A | * | 10/1993 | Akamatsu | G06T 11/203 345/442 |
| 5,691,930 A | * | 11/1997 | Kim | 708/628 |
| 5,990,894 A | * | 11/1999 | Hu et al. | 345/418 |
| 6,003,058 A | * | 12/1999 | Kirschenbaum | G06F 17/16 708/517 |
| 6,611,265 B1 | * | 8/2003 | Hong et al. | 345/426 |
| 6,891,538 B1 | * | 5/2005 | Tannenbaum | 345/426 |
| 2007/0057972 A1 | * | 3/2007 | Krasnopolsky | 345/629 |

(Continued)

OTHER PUBLICATIONS

Cheng-Hsien Chen, A Cost Effective Lighting Processor for 3D Graphics Application, In: Image Processing, 1999. ICIP 99. Proceedings. Dec. 31, 1999. See whole document.

(Continued)

*Primary Examiner* — Devona Faulk
*Assistant Examiner* — Hai Tao Sun
(74) *Attorney, Agent, or Firm* — Patent Capital Group

(57) ABSTRACT

Disclosed is an apparatus and method for generating a lighting value based on a number of lighting factors. A lighting accelerator first converts an ambient portion, a diffuse light portion, and a specular light portion of the lighting factors into the log domain. Then, data combination units operate on the lighting factors after they have been converted. Then, the lighting factors are converted back from the log domain using anti-log processing. Converting the lighting factors into the log domain is accomplished by using a series of linear equations using coefficients that are all based on powers of two, and are therefore easily calculable. Further, while in the log domain, the specular light portion of the lighting factor is operated on by a special purpose multiplier that uses a truncated partial product tree, saving area and power with only a negligible amount of error.

17 Claims, 9 Drawing Sheets

300

(56) References Cited

U.S. PATENT DOCUMENTS

2008/0024512 A1* 1/2008 Chuter .................. 345/584
2010/0121898 A1* 5/2010 Swartzlander et al. ...... 708/501
2011/0213664 A1* 9/2011 Osterhout et al. ......... 705/14.58

OTHER PUBLICATIONS

Y.S. Kwon et al., A Hardware Accelerator for the Specular Intensity of Phong Illumination Model in 3-Dimensional Graphics, In: IEEE Asia and South Pacific Design Automation Conference, Dec. 31, 2000. See whole document.

International Search Report and Written Opinion, dated Sep. 14, 2012, International Application No. PCT/US2011/068265, Korean Intellectual Property Office, Metropolitan City, Korea.

* cited by examiner

Phong Illumination for multiple light sources $$I = k_a \cdot I_a + \sum_{i=1}^{n} I_{li}\left(k_d\left(\vec{N} \bullet \vec{L}_i\right) + k_s\left(\vec{R}_i \bullet \vec{V}\right)^S\right)$$

Phong Illumination for a single light source $$I = k_a \cdot I_a + I_l\left(k_d\left(\vec{N} \bullet \vec{L}\right) + k_s\left(\vec{R} \bullet \vec{V}\right)^S\right)$$

$$\log_2\left[2^E(1+m)\right] = E + \log_2(1+m)$$

$$\log_2(1+m) \cong \begin{cases} m + \dfrac{3}{8}m & 0 \le m < 0.125 \\ m + \dfrac{1}{4}m + \dfrac{1}{64} & 0.125 \le m < 0.25 \\ m + \dfrac{1}{16}m + \dfrac{1}{16} & 0.25 \le m < 0.5 \\ m - \dfrac{1}{8}m + \dfrac{1}{8} + \dfrac{1}{32} & 0.5 \le m < 0.75 \\ m - \dfrac{1}{4}m + \dfrac{1}{4} & 0.75 \le m < 1.0 \end{cases}$$

$$2^{\overline{S \times \log_2 (\vec{R} \bullet \vec{v})}} = 2^{-(n+1)} \cdot 2^{\eta}, n \in Z, 0 < \eta < 1$$

$$2^{\eta} \cong \begin{cases} 1 + \eta - \dfrac{1}{4}\eta & 0 \leq \eta < 0.25 \\ 1 + \eta - \dfrac{1}{8}\eta - \dfrac{1}{32} & 0.25 \leq \eta < 0.5 \\ 1 + \eta + \dfrac{1}{16}\eta - \dfrac{1}{8} & 0.5 \leq \eta < 0.75 \\ 1 + \eta + \dfrac{5}{16}\eta - \dfrac{5}{16} & 0.75 \leq \eta < 1 \end{cases}$$

GRAPHICS LIGHTING ENGINE INCLUDING LOG AND ANTI-LOG UNITS

TECHNICAL FIELD

The disclosed technology relates to three-dimensional graphics, and, more particularly, to a graphics lighting engine that includes log and anti-log units for performing lighting computations.

BACKGROUND

Shading and texture mapping are the most compute intensive and power hungry stages of the 3D graphics pipeline illustrated in FIG. 1. Power consumption in texture mapping is dissipated primarily in memory accesses. In geometry processing, lighting computation takes up to 83% of geometry transformation clock cycles.

Lighting computation determines the color intensity of each pixel within a rendered primitive. Illumination is the transport of luminous flux (measure of perceived power of light) from light sources through direct and indirect paths, and may be adjusted to reflect the varying sensitivity of the eye to different wavelengths of light. Lighting refers to the interaction between materials and light sources, thus determining the intensity of color for each pixel. Shading determines the color of a pixel based on illumination and lighting models.

A simplified and widely used model for lighting is referred to as the Phong Illumination Equation which describes reflected light intensity in terms of ambient, diffuse, and specular components and it is computed for each R, G, B component and for each light source. The equation is given as:

$$I = k_a \cdot I_a + \sum_{i=1}^{n} I_{li}\left(k_d(\vec{N} \cdot \vec{L}_i) + k_s(\vec{R}_i \cdot \vec{V})^S\right)$$

where the 'a' terms refer to ambient components of the illumination, the 'd' terms refer to diffuse components, and the 's' terms refer to the specular components. The term $k_a$ is a weighting constant, $I_a$ is the ambient light source intensity, $I^{li}$ is the intensity from each light source, $k_d$ is the diffusion weighting constant, N·L is the dot product of the surface normal with the direction of the light source, $k_s$ is the specular weighting constant, R·V is the dot product of the reflection vector of the light source about the normal to the surface with the viewing vector V, and S is the specular coefficient. This lighting model can be applied on a per-vertex basis, such as in a vertex shading block 120 of FIG. 1, and on a per-pixel basis in a fragment or pixel shading block 130.

The most compute-intensive part of calculating terms according to the Phong Illumination Equation is computation of the specular term, as it involves a power term. Computing the power term consumes the majority of clock cycles. The computation of a floating point number, referred to herein as the number, to the power of another floating point number, referred to herein as the power term, is very difficult to implement using standard hardware components. The best prior art methods to implement the computation of exponentiation in hardware include a software math library, table lookup of exponentiation, linear interpolation with table lookup, and Taylor/Chebyshev approximation which replaces exponentiation with a polynomial.

The best known methods of computing the Phong illumination Equation are illustrated in FIG. 2. In these methods, the specular term is transformed to the log domain, and the specular coefficient is multiplied with the transformed term in the log domain. Then the result is transformed back to decimal arithmetic using an anti-log transformation. The ambient and diffuse terms are computed outside of the log domain, which requires five separate floating point multiplications.

Log and anti-log approximations are currently implemented by using either table lookup, which can be memory intensive, or by using linear interpolation with either three intervals, which leads to a relatively high error, or more than six intervals, which adds complexity and area. Conventional multipliers used to compute the specular power term are either a full 32 b×32 b multiplier or a 24 b×24 b mantissa multiplier. The former requires increased area and hence power, and the latter results in lower precision.

Embodiments of the invention address these and other limitations of the prior art.

BRIEF DESCRIPTION OF THE DRAWINGS

Embodiments of the invention are illustrated by way of example, and not by way of limitation, in the drawings and in which like reference numerals refer to similar elements.

DETAILED DESCRIPTION

Figure 1:
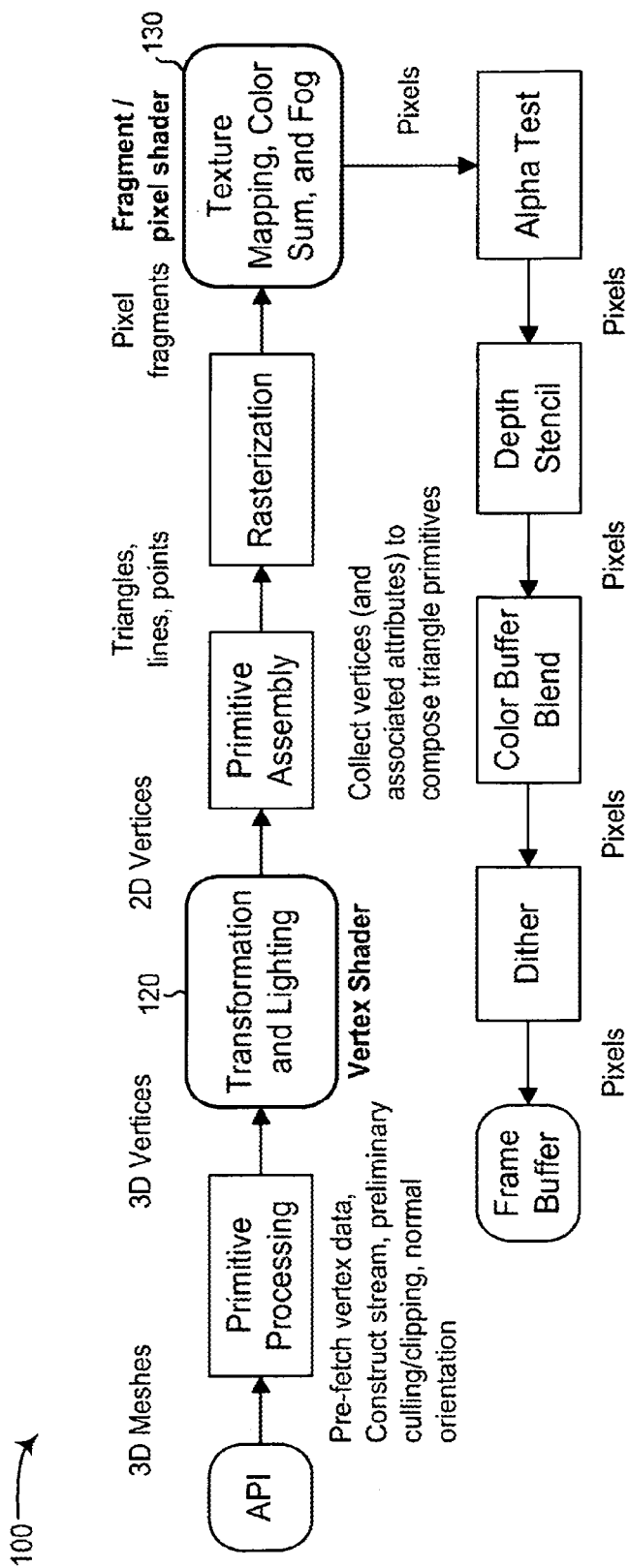
FIG. 1 is a functional block diagram illustrating a conventional three-dimensional graphics pipeline.
Figure 2:
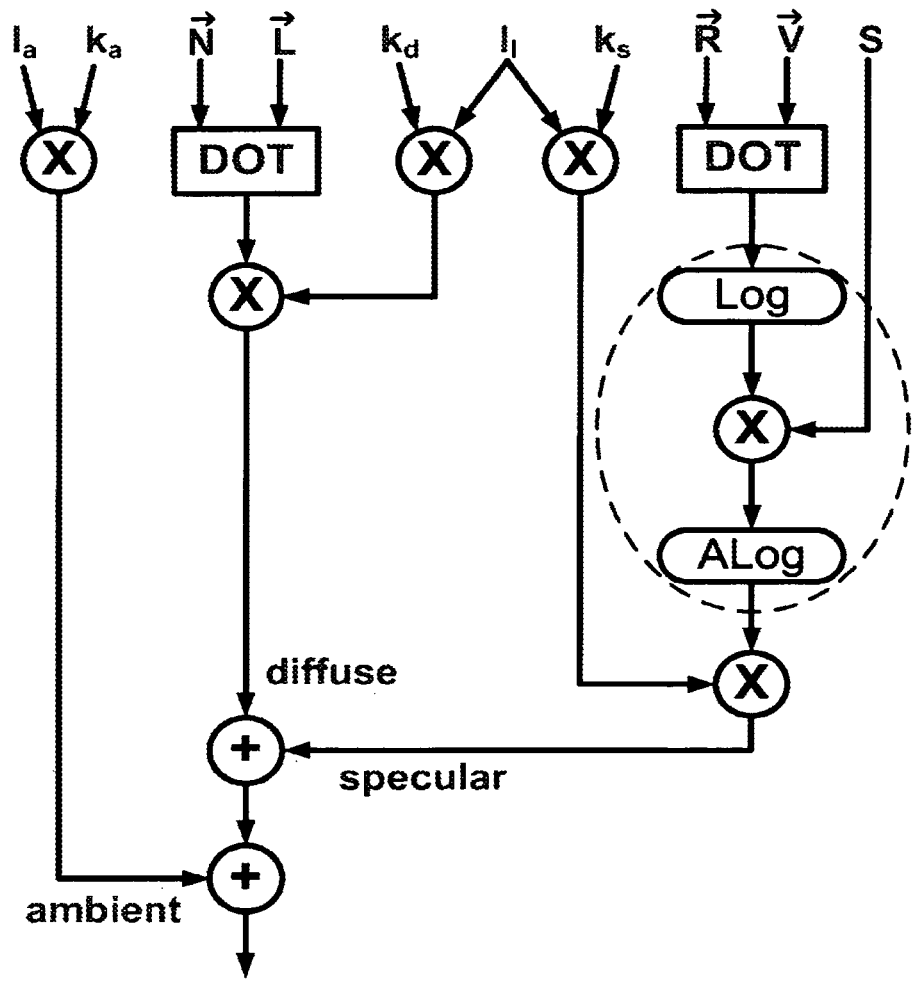
FIG. 2 is a functional block diagram illustrating a conventional processor for computing Phong illumination calculations.
Figure 3:
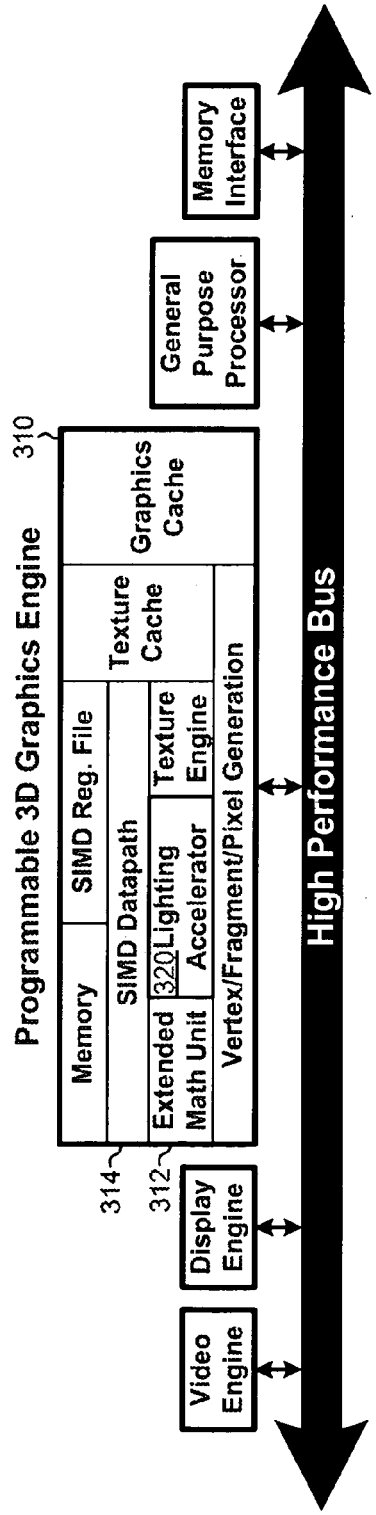
FIG. 3 is a functional block diagram of a graphics engine including a lighting accelerator unit according to embodiments of the invention.

FIG. 3 is a functional block diagram of a system 300 including a graphics engine 310 with a lighting accelerator unit 320 according to embodiments of the invention. The graphics engine 310 includes multiple components used for processing the graphics pipeline illustrated in FIG. 1. For example a SIMD (Single Instruction Multiple Data) datapath 314 provides instructions and data for operation by the graphics engine. An extended math unit 312 is used to perform specialized math functions that may prevent the SIMD datapath 314 from operating most efficiently. In other words, the extend math unit 312 offloads some of the more difficult processing from the SIMD datapath 314.

Embodiments of the invention would typically be located in the lighting accelerator unit 320 of the graphics engine 310 of FIG. 3, but concepts of the invention are not limited to any particular hardware location or software process.

Figure 4:
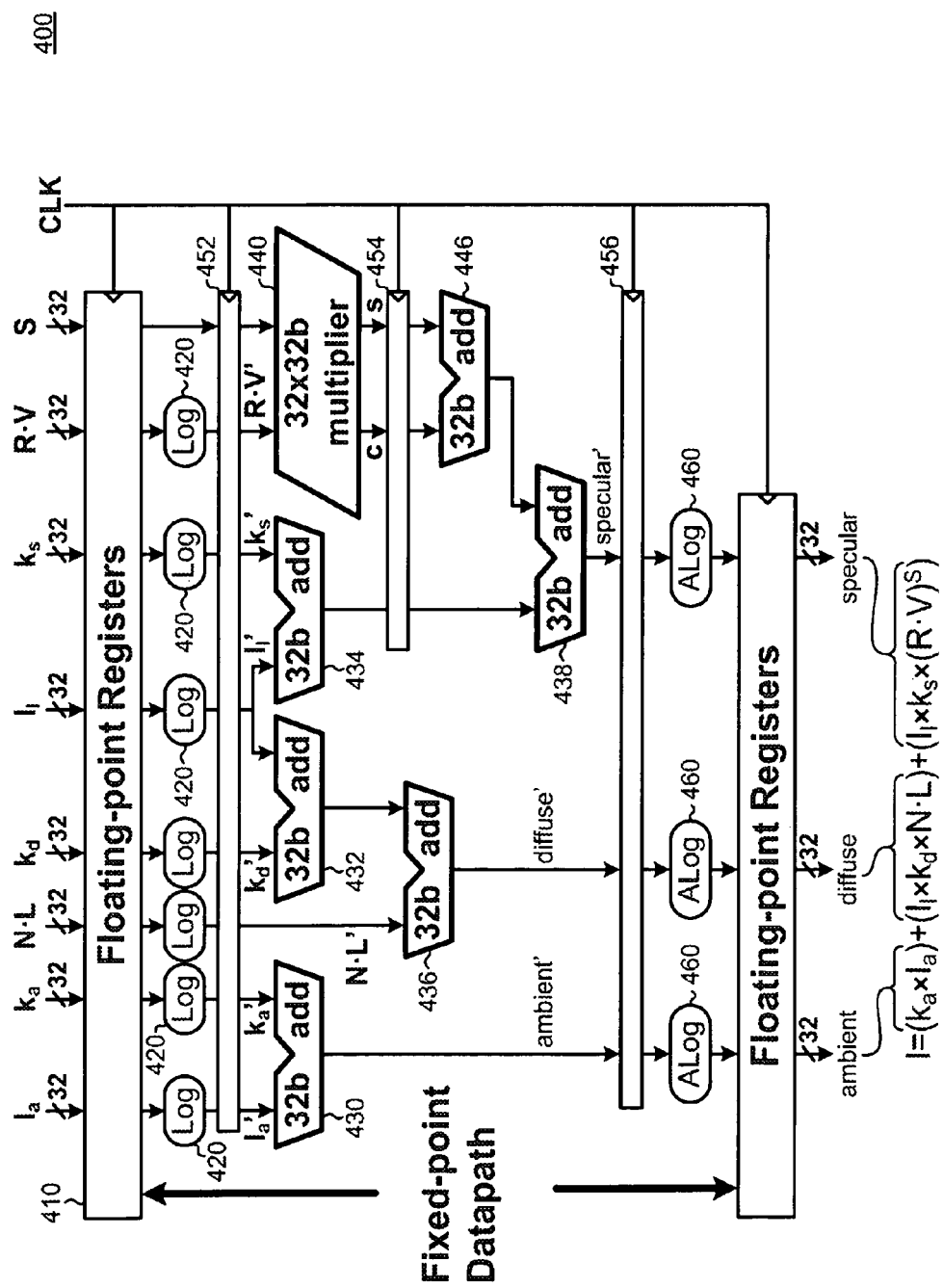
FIG. 4 is a functional block diagram illustrating a lighting accelerator unit including log and anti-log units according to embodiments of the invention.

FIG. 4 is a functional block diagram illustrating a lighting accelerator unit including log and anti-log units according to embodiments of the invention. Embodiments of the invention compute all of the ambient, diffuse, and specular terms of a lighting equation in the log domain. Once converted into the log domain, terms that previously were multiplied in the arithmetic number domain may be added together, saving computation resources.

In FIG. 4, a lighting accelerator 400 includes a series of registers 410 used to store floating point numbers that represent the lighting values described above. A series of log units 420 convert the floating point numbers into the log domain using a series of linear equations as described in detail below. The log units 420 may include multiple units, as illustrated in FIG. 4, or may be embodied in one or more physical units. In the preferred embodiment five linear intervals are used in the equation for the log conversion, as described below with reference to FIG. 7. The majority of the ambient and diffuse calculations are performed in the log domain using a series of adders 430, 432, 434, 436, and 438. A multiplier unit 440, described with reference to FIG. 8 below, performs multiplication of the specular components in the log domain, which are then added in an adder 446. Then, a series of anti-log units 460 convert the data back into single precision numbers. As with the log units 420, the anti-log units 460 may be separate units, an individual unit, or any combination. Different from the log units 420, however, the preferred embodiment of the anti-log units 460 use a series of four linear intervals in its system of linear equations used to perform the anti-log function. These intervals, as well as the log intervals, represent the best tradeoff in terms of power, performance, area and accuracy. The preferred embodiment of the lighting accelerator 400 also includes a number of internal registers 452, 454, and 456 to internally store intermediate results.

In general, in operation of the lighting accelerator 400, the ambient light source intensity, other light source intensities, weighting constants, and the specular coefficient are first input from the floating point registers 410 to a respective log unit 420 to transform the components to the log domain. The log unit 420 uses linear interpolation with five intervals to approximate the base-2 logarithm. Each input to the log unit 420 is a number between 0 and 1, or normalized to be between 0 and 1. The error of the log unit 420 is small (less than 0.5%) as the numbers are limited in range. Then, the ambient, diffuse, and specular terms of the Phong equation are computed using log arithmetic employing a total of six adders 430, 432, 434, 436, 438 and 446 and one multiplier 440 as shown in FIG. 4.

Figure 5:
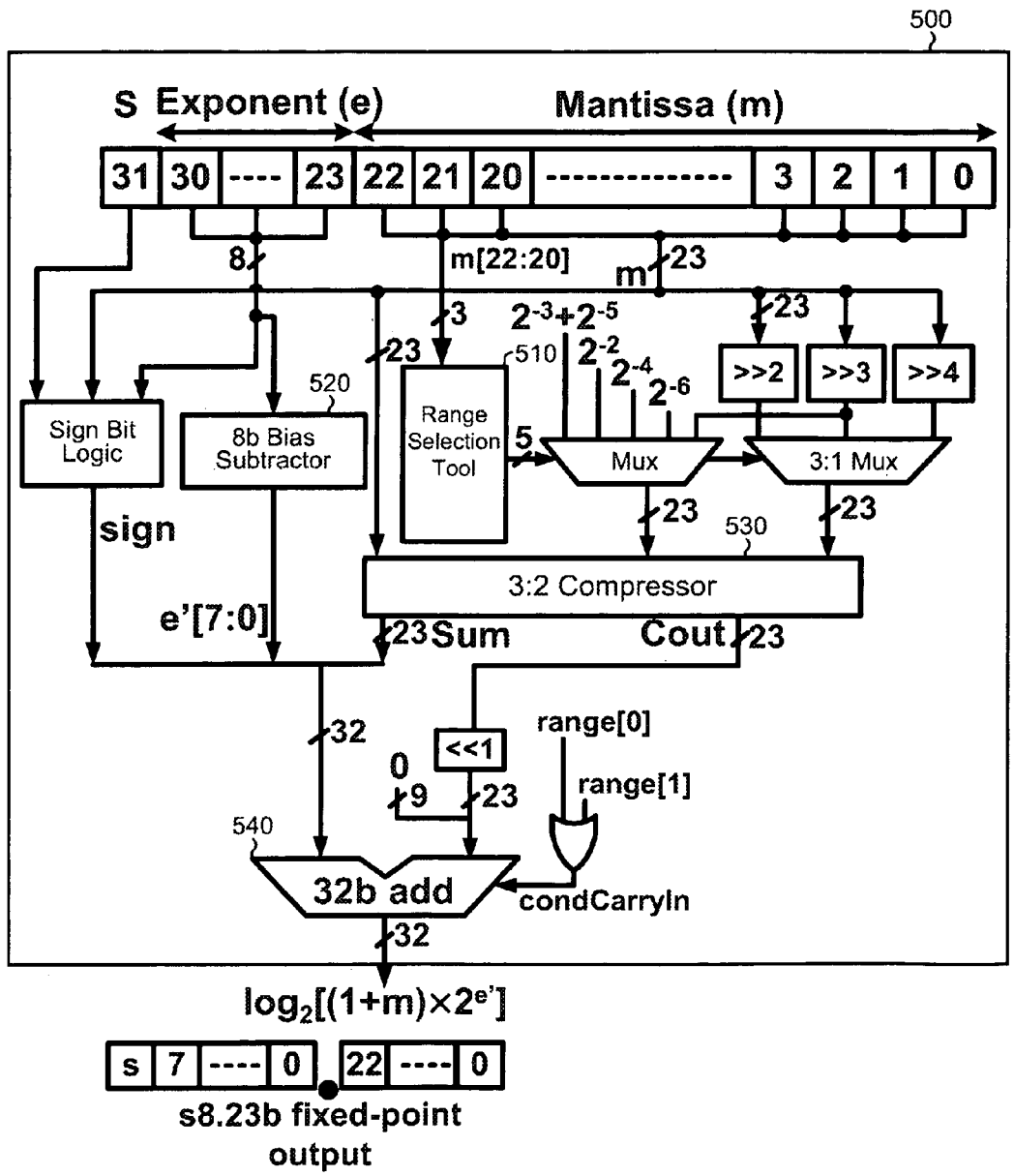
FIG. 5 is a functional block diagram of a log processor used in the lighting-accelerator of FIG. 4 according to embodiments of the invention.

FIG. 5 is a functional block diagram of a log processor 500, which may be an example of the log unit 420 illustrated in FIG. 4. As described above, the computation in the fixed data path illustrated in FIG. 4 is preferably performed using fixed point arithmetic. The output of the log processor 500 produces the fixed point numbers for such processing. As illustrated in the bottom of FIG. 5, the fixed point numbers are represented as a 32-bit number with the most significant bit representing the sign, the next 8 bits representing an integer, and remaining 23 bits representing the fractional portion. Fixed-point computation reduces power and improves performance in the lighting accelerator.

Figures 6, 7:
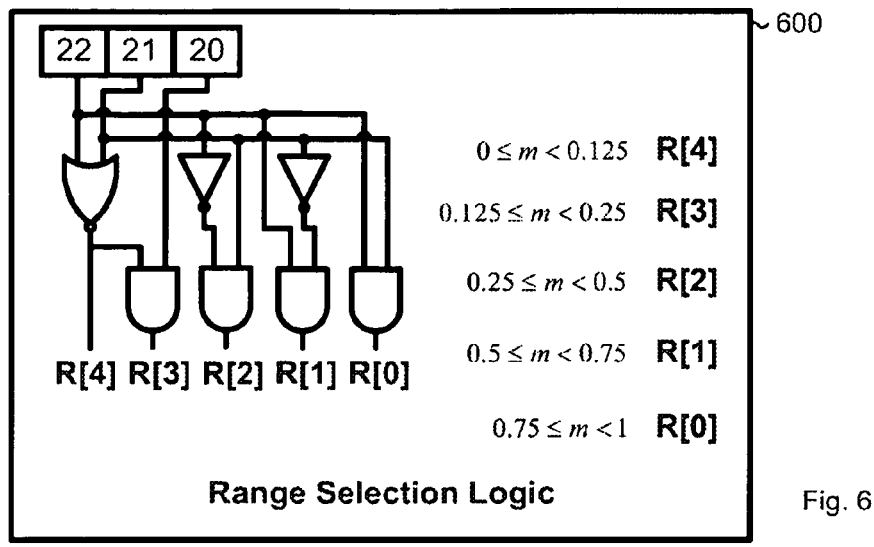
FIG. 6 is a block diagram of a selection circuit used in the log processor of FIG. 5 according to embodiments of the invention.
FIG. 7 is a chart that illustrates five intervals used to approximate a log function using a linear equation according to embodiments of the invention.

The log processor 500 includes range selection logic 510 which uses the upper three bits of the mantissa of the input single precision number to determine which linear equation is to be used, as described below. An example range selection logic 600 is shown in FIG. 6, along with the preferred division of ranges for the log approximation. The output of the range selection 510 logic is used to select the appropriate constants and coefficients for the particular of the five equations being used, based on a portion of the mantissa value. Referring back to FIG. 5, the bias from the exponent of the single precision is first removed by adding it to −127 (0x81 is the hexadecimal representation) which is implemented by an incrementing block 520 and inversion of the Most Significant Bit (MSB). After the correct constants and coefficients are selected, the outputs are fed to a 3:2 compressor 530 and subsequent completion adder 540. The coefficients are simply bit-shifts of the mantissa portion by a set number of bits depending on which interval the mantissa portion is a member of.

Computing exponentiation in the log domain results in a simple multiplication at the expense of accuracy. The error is minimized if the number that is input to the log unit is between 0 and 1, and can be computed quite quickly (~4 clock cycles) using a handful of linear intervals in the preferred embodiment. Embodiments of the invention use log arithmetic to compute the exponentiation in the log units 420 using a base-2 log unit that is implemented using linear interpolation. Since the number input to the base-2 logarithm is between 0 and 1, the accuracy of the computation is mostly retained.

The log processor 500 uses five intervals which approximate the log using a linear equation. The equations for each interval are given in FIG. 7. Note that each of the coefficients of the equation are factors of 2, which may be readily implemented in digital logic using bit-shifts. Further, the coefficients have a low hamming weight. Using five interpolation levels provides very good accuracy. In practice, the range selection tool 510 of FIG. 5 reviews the MSBs of the mantissa, then selects the appropriate linear equation for the log approximation using the ranges illustrated in FIG. 7.

Figure 8:
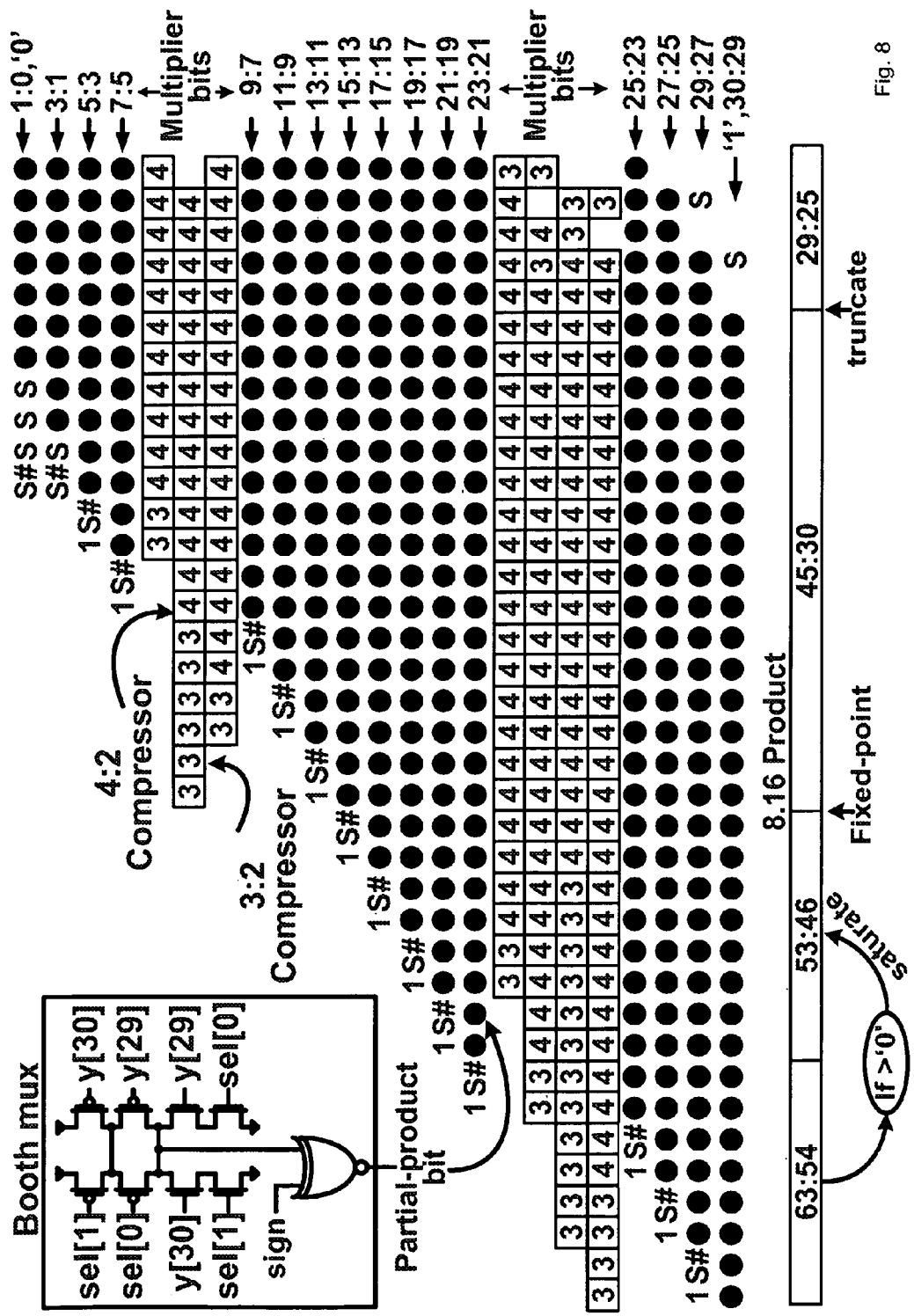
FIG. 8 is a chart illustrating partial product rows and compressor stages for a multiplier used in the lighting accelerator unit of FIG. 4 according to embodiments of the invention.

After being converted into the log domain by the log processor 500, the specular calculations are operated on in the log domain by a multiplier 440 (FIG. 4), as described above. The multiplier 440 of FIG. 4 may be realized by a signed 32 b×32 b Booth-encoded fixed point multiplier with a truncated partial product tree. This unit computes the exponentiation operation of the specular lighting component in the log domain by computing the fixed point product of 8.23 bit R·V with the specular 8.23 constant 'S'. The output 16.46 b result is truncated to a 8.16 b fixed point result, eliminating 31% of the partial-product bits (544 partial-product bits down to 376 bits). FIG. 8 illustrates partial product rows and the three stages of 4:2 compressors for the reduced precision multiplier 440. The 16 b integer section of the output is saturated at 8 bits and the 46 b fractional result is truncated at the 16 b boundary, eliminating the lower-order 30 bits. Partial-product bits from columns 29:25 are retained, as illustrated in FIG. 8 to the right of the truncate indicator, to capture the effect of all carries that propagate across the 16 b boundary. This results in a maximum error of $2^{-16}$ in the truncated result. In a preferred embodiment, the signed multiplier uses a radix-4 modified Booth encoder to generate 16 partial-product rows. These rows are merged using 3 stages of 4:2 compressors, resulting in a partial-product reduction tree made up of 177 compressors, a 29% reduction over a full 32 b×32 b signed multiplier.

Figure 9:
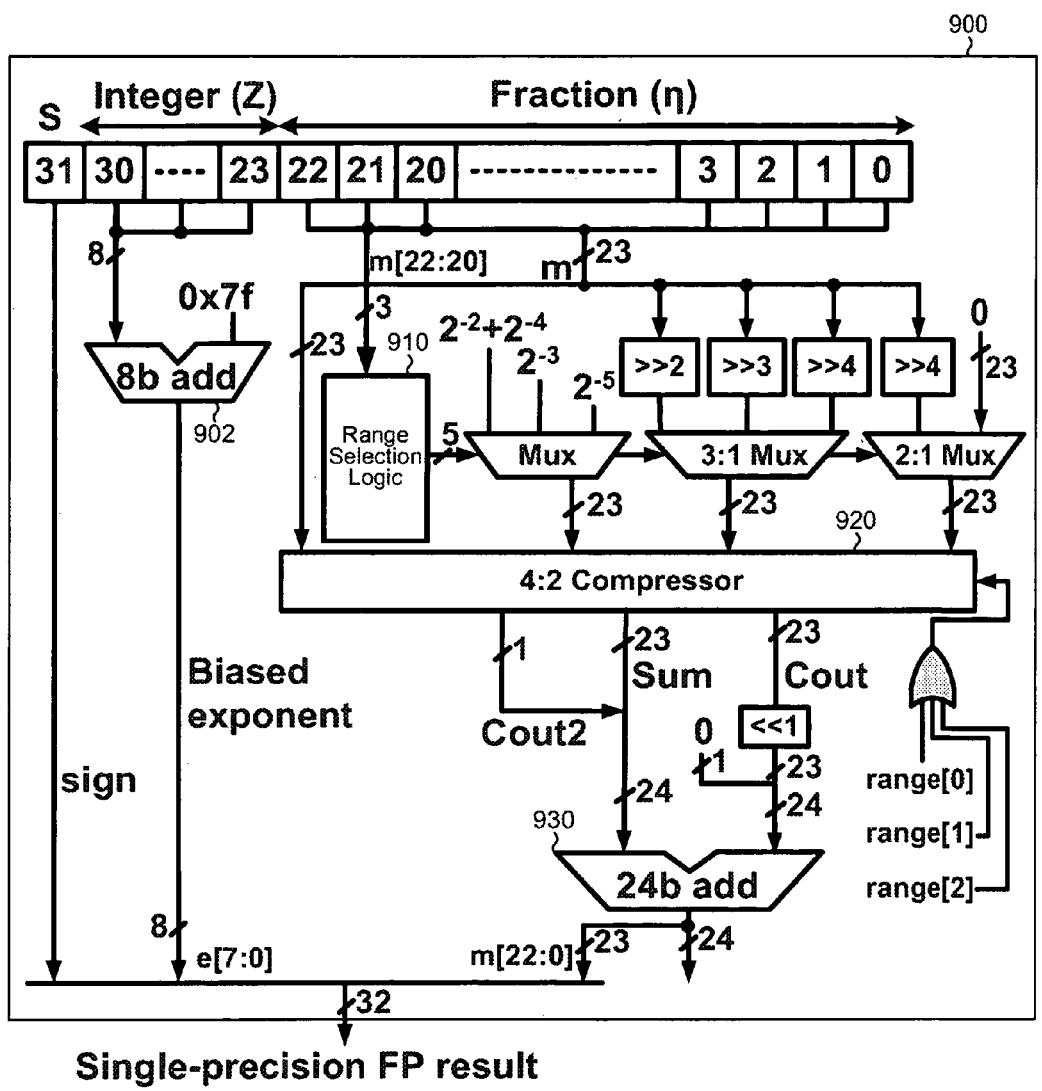
FIG. 9 is a functional block diagram of an anti-log processor used in the lighting accelerator of FIG. 4 according to embodiments of the invention.

FIG. 9 illustrates an example embodiment of an anti-log processor 900, which may be an example implementation of the anti-log unit 460 of FIG. 4. The anti-log processor 800 takes as input a 32-bit fixed point representation, as described earlier. The anti-log processor approximates the mantissa portion of the single precision output using linear interpolation with four intervals. The equations for the anti-log unit 460 as well as the four interpolation levels are given in FIG. 10. The interpolation levels for the anti-log processor 900 are similar to those of the log processor 500, described above, except that the lowest two levels of the log processor are collapsed into the lowest level of the anti-log processor, as illustrated in FIGS. 7 and 10.

Referring back to FIG. 9, the exponent for the resulting single precision number is computed by adding 127 (0x7F) to the 8 bits representing the integer portion of the fixed point input to obtain the biased negative exponent in an adder 902. The mantissa portion is computed by linear interpolation as shown in the equations and using the coefficients illustrated in FIG. 10. The coefficients are computed using bit-shifts of the fractional portion of the input fixed point number and the appropriate constants are selected based on range selection logic 910, which may be the same or similar logic to the range shift logic 600 illustrated in FIG. 6. A 4:2 compressor 920 adds the four inputs before passing the resulting carry and sum to a 24 b completion adder 930. The completion adder 930 may be embodied by a quaternary tree adder, which is a highly efficient adder.

Figures 10, 11:
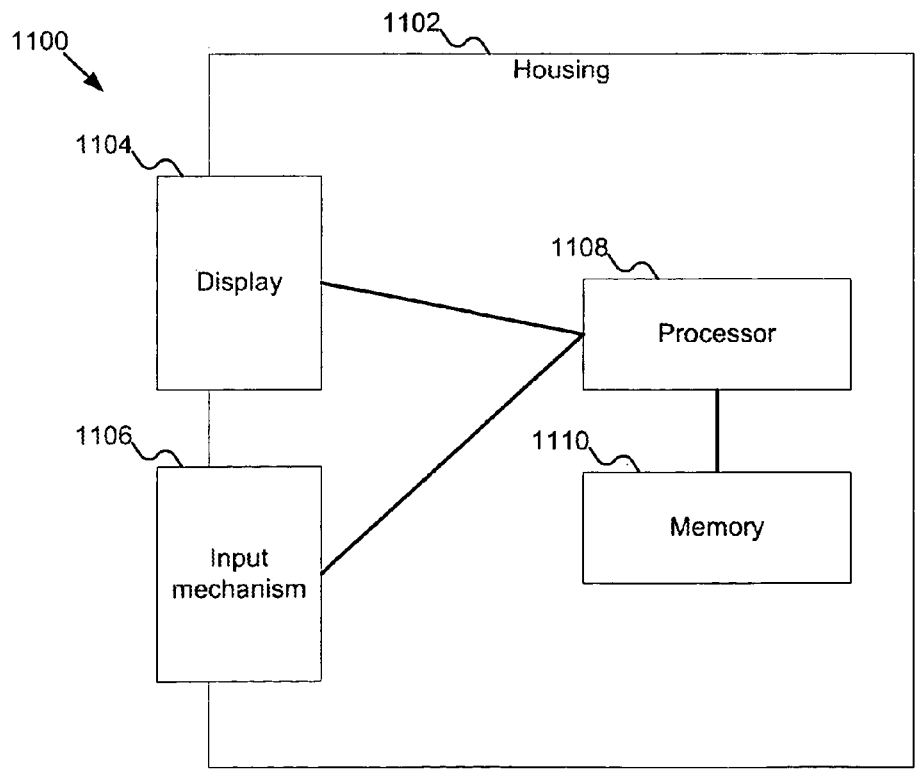
FIG. 10 is a chart that illustrates four intervals used to approximate an anti-log function using a linear equation according to embodiments of the invention.
FIG. 11 is a block diagram of a mobile device incorporating embodiments of the invention.

FIG. 11 illustrates an example of a system 1100 in which embodiments of the disclosed technology may be implemented. The system 1100 may include, but is not limited to, a computing device such as a laptop computer, a mobile device such as a handheld or tablet computer, a communications device such as a smartphone, or an industry-specific machine such as a kiosk or ATM. The system 1100 includes a housing 1102, a display 1104, which may be in association with the housing 1102, an input mechanism 1106, which may also be in association with the housing 1102, a processor 1108 within the housing 1102, and a memory 1110 within the housing 1102. The input mechanism 1106 may include a physical device, such as a keyboard, or a virtual device, such as a virtual keypad implemented within a touchscreen. The processor 1108 may perform virtually any of or any combination of the various operations described above. The illustrated processor 1108 may include a separate graphics processor including a lighting accelerator as described above, in a lighting unit, or such graphics capabilities may be included in the processor itself. The memory 1110 may store information resulting from processing performed by the processor 1108.

Embodiments of the disclosed technology may be incorporated in various types of architectures. For example, certain embodiments may be implemented as any of or a combination of the following: one or more microchips or integrated circuits interconnected using a motherboard, a graphics and/or video processor, a multicore processor, hardwired logic, software stored by a memory device and executed by a microprocessor, firmware, an application specific integrated circuit (ASIC), and/or a field programmable gate array (FPGA). The term "logic" as used herein may include, by way of example, software, hardware, or any combination thereof.

Although specific embodiments have been illustrated and described herein, it will be appreciated by those of ordinary skill in the art that a wide variety of alternate and/or equivalent implementations may be substituted for the specific embodiments shown and described without departing from the scope of the embodiments of the disclosed technology. This application is intended to cover any adaptations or variations of the embodiments illustrated and described herein. Therefore, it is manifestly intended that embodiments of the disclosed technology be limited only by the following claims and equivalents thereof.

What is claimed is:

1. An apparatus, comprising:
   an input for receiving a plurality of numbers representing lighting factors;
   a lighting accelerator coupled to the input and structured to generate a lighting value based on the received lighting factors, the lighting accelerator including:
   a plurality of log units, at least one log unit for each of an ambient portion, a diffuse light portion, and a specular light portion, at least one of the log units including:
   an input for receiving a single precision floating point number between 0 and 1,
   a linear interpolator structured to approximate a log of the received number, the linear interpolator including five separate intervals, in which a particular one of the five separate intervals is used to approximate the log of the number depending on a value of the received number, and
   an output structured to output a log approximation of the received number;
   a plurality of anti-log units, at least one anti-log unit for each of the ambient portion, the diffuse light portion, and specular light portion; and
   a Booth-encoded fixed point multiplier positioned between the log units and the anti-log units, the Booth-encoded fixed point multiplier configured to employ a truncated partial product tree to perform multiplication operations on the specular light portion in a log domain.

2. The apparatus of claim 1, further comprising one or more adders positioned between the log units and the anti-log units, the adders configured to perform addition computations on the ambient light portion in the log domain, the one or more adders further configured to perform addition computations on the diffuse light portion in the log domain.

3. The apparatus of claim 1, in which the log approximation is output as a fixed-point number.

4. The apparatus of claim 1 in which the five separate intervals of the linear interpolator are determined based on a plurality of coefficients.

5. The apparatus of claim 4, in which the plurality of coefficients are all powers of two, and are implemented with shift circuits and a selector.

6. An apparatus, comprising:
   an input for receiving a plurality of numbers representing lighting factors;
   a lighting accelerator coupled to the input and structured to generate a lighting value based on the received lighting factors, the lighting accelerator including:
   a plurality of log units, at least one log unit for each of an ambient portion, a diffuse light portion, and a specular light portion;
   a plurality of anti-log units, at least one anti-log unit for each of the ambient portion, the diffuse light portion, and specular light portion, in which at least one of the plurality of anti-log units comprises:

an input for receiving a fixed-point number including a sign portion, an integer portion, and a fractional portion, and in which the fractional portion has a value between 0 and 1;

an anti-log linear interpolator structured to approximate a mantissa of a floating point number from the fractional portion of the fixed-point number, and to derive an exponent of the floating point number, in which the linear interpolator includes four separate intervals, and in which a particular one of the four separate intervals is used to approximate the mantissa of the floating point number depending on a value of the received fixed-point number; and an output structured to output a representation of the approximated mantissa and the derived exponent; and a Booth-encoded fixed point multiplier positioned between the log units and the anti-log units, the Booth-encoded fixed point multiplier configured to employ a truncated partial product tree to perform multiplication operations on the specular light portion in a log domain.

7. The apparatus of claim 6, in which the one of the plurality of anti-log units comprises: a range selector structured to determine which of the particular of the four separate intervals is to be used.

8. A method comprising:

receiving a plurality of numbers representing lighting factors; and generating a lighting value in a lighting accelerator based on the received lighting factors by:

converting an ambient portion lighting factor, a diffuse portion lighting factor, and a specular portion lighting factor from an arithmetic number domain into a log domain by:

receiving a single precision floating point input number including a sign portion, an integer portion, and a fractional portion, and in which the fractional portion has a value between 0 and 1, approximating a log of the input number using a particular one of five separate intervals in a linear interpolator, the approximating depending on a value of the input number, and generating an output for the approximated log;

multiplying specular portion lighting factors using a Booth-encoded fixed point multiplier having a truncated partial-product tree;

truncating an interim of the partial-product tree result to a final output for the specular portion lighting factor;

employing adders to combine factors for each of the ambient portion lighting factor, diffuse portion lighting factor, and specular portion lighting factor in the log domain; and converting the combined factors for each of the ambient portion lighting factor, diffuse portion lighting factor, and specular portion lighting factor back into the arithmetic number domain using an anti-log unit.

9. The method of claim 8, further comprising multiplying two 32 b numbers together and generating an output in the form of 8.23b times 8.23b.

10. The method of claim 8, in which converting the combined factors for each of the ambient portion, diffuse portion, and specular portions back into the arithmetic number domain using an anti-log unit comprises:

receiving a fixed point number including a sign portion, an integer portion, and a fractional portion, and in which the fractional portion has a value between 0 and 1 at an input;

approximating a mantissa of a floating point number from the fractional portion of the fixed-point number, and deriving an exponent of the floating point number using a second linear interpolator; and generating an output of a representation of an approximated anti-log.

11. The method of claim 10, in which the second linear interpolator includes four separate intervals, and in which a particular one of the four separate intervals is used to approximate the mantissa of the floating point number depending on a value of the received fixed-point number.

12. A method, comprising:

in a portable device, detecting an action of an input mechanism;

generating a request to generate a lighting value based on the action;

in a graphics processor on the portable device, receiving a plurality of numbers representing lighting factors;

generating a lighting value in a lighting accelerator based on the received lighting factors by:

converting an ambient portion lighting factor, a diffuse portion lighting factor, and a specular portion lighting factor from an arithmetic number domain into a log domain by:

receiving a single precision floating point input number including a sign portion, an integer portion, and a fractional portion, and in which the fractional portion has a value between 0 and 1, approximating a log of the input number using a particular one of five separate intervals in a linear interpolator, the approximating depending on a value of the input number, and generating an output for the approximated log, multiplying specular portion lighting factors using a Booth-encoded fixed point multiplier having a truncated partial-product tree;

truncating an interim of the partial-product tree result to a final output for the specular portion lighting factor;

combining factors for each of the ambient portion lighting factor, the diffuse portion lighting factor, and the specular portion lighting factor, in which combining factors for at least the diffuse portion lighting factor includes performing an addition computation in the log domain, and converting the combined factors for each of the ambient portion lighting factor, the diffuse portion light factor, and the specular portion lighting factor back into the arithmetic number domain using an anti-log unit; and outputting an image on a display of the portable device using, at least in part, based on the generated lighting value.

13. The method of claim 12, in which converting the combined factors for each of the ambient portion, diffuse portion, and specular portions back into the arithmetic number domain using an anti-log unit comprises:

receiving a fixed point number including a sign portion, an integer portion, and a fractional portion, and in which the fractional portion has a value between 0 and 1 at an input;

approximating a mantissa of a floating point number from the fractional portion of the fixed-point number, and deriving an exponent of the floating point number using a second linear interpolator; and generating an output of a representation of the approximated anti-log.

14. The method of claim 13, in which the second linear interpolator includes four separate intervals, and in which a particular one of the four intervals is used to approximate the mantissa of the floating point number depending on a value of the received fixed-point number.

15. The method of claim 14, further comprising deriving at least one coefficient for the particular interval using only a shifter and a selector.

16. The apparatus of claim 1, in which the linear interpolator includes five separate intervals, and in which the apparatus further includes one or more adders positioned between the log units and the anti-log units, the adders configured to perform addition computations on the ambient light portion in a log domain.

17. The apparatus of claim 6, in which the linear interpolator includes four separate intervals, and in which the apparatus further includes one or more adders positioned between the log units and the anti-log units, the adders configured to perform addition computations on the diffuse light portion in a log domain.

* * * * *